United States Patent [19]

Doss

[11] 4,180,514

[45] Dec. 25, 1979

[54] ADHESION PROMOTER AND METHOD OF PREPARATION

[75] Inventor: Richard C. Doss, Bartlesville, Okla.

[73] Assignee: Phillips Petroleum Company, Bartlesville, Okla.

[21] Appl. No.: 876,437

[22] Filed: Feb. 9, 1978

[51] Int. Cl.$^2$ .............................................. C08K 5/36
[52] U.S. Cl. ........................... 428/417; 260/45.75 N; 428/418; 428/419; 428/416;
[58] Field of Search ............... 260/45.75 N, 836, 837, 260/830 P, 830 S; 428/415, 416, 417, 418, 419

[56] References Cited

U.S. PATENT DOCUMENTS

| | | | |
|---|---|---|---|
| 3,870,676 | 3/1975 | Condon | 260/836 |
| 3,932,321 | 1/1976 | Kutch | 260/27 |
| 3,932,324 | 1/1976 | Stretanski | 260/45.75 N |

Primary Examiner—V. P. Hoke

[57] ABSTRACT

A nickel-containing ultraviolet (U.V.) absorber and an uncured epoxy resin are both mixed with a sealant base to provide a sealant with greater adhesion strength to glass and aluminum after water weathering than when either the epoxy resin or U.V. absorber is alone mixed with the sealant base.

32 Claims, No Drawings

ADHESION PROMOTER AND METHOD OF PREPARATION

FIELD OF THE INVENTION

This invention relates to sealants. In one aspect, it relates to a method of preparing a sealant having improved adhesive strength. In another aspect, it relates to a sealant composition with improved adhesive strength. In a further aspect, it relates to an article of manufacture wherein the sealant composition seals at least a part of the article.

BACKGROUND OF THE INVENTION

In the insulated glass industry and in the mobile home industry, an important problem is to find a sealant composition which will seal glass, as well as a variety of other materials (such as aluminum), and which will be economical, have good resistance to weathering by water exposure and ultraviolet radiation, and have good adhesive strength both before and after weathering. Preferably, the sealant also should require no surface primer.

Furthermore, preferably the sealant possesses the characteristics of having low moisture vapor transmission (which is a measure of the rate of transmission of water vapor through a thickness of the sealant), high elasticity or percent recovery (which measures the ability of the sealant to return to its original shape after extreme expansion or elongation and therefore to continue to adhere to the surface being sealed without failure due to distortion), and a bulk melt viscosity which is not so high that large amounts of energy will be wasted on melting the sealant if it is to be applied as a melt.

It is an object of this invention to prepare an improved sealant. It is a further object of this invention to use the sealant to prepare improved articles of manufacture.

The present invention provides an excellent solution to the need for a sealant with high adhesive strength which will withstand much weathering and which requires no surface primer.

STATEMENT OF THE INVENTION

According to the invention, a mixture of a thioamino nickel-containing U.V. absorber and an uncured epoxy resin containing at least one terminal epoxy group are combined with a base polymer selected from the group comprising rubbery and resinous polymers to yield a sealant possessing much better adhesive strength to glass and aluminum after water weathering than results when either the epoxy resin or the U.V. absorber alone is added.

Further, according to the invention, the sealant is used to seal at least a part of an article of manufacture.

Also according to the invention, a hot melt sealant is prepared with the above ingredients and at least one thermal stabilizer and at least one modifying resin.

DESCRIPTION OF THE PREFERRED EMBODIMENTS

In this invention, a sealant is defined as a material which can be applied between two or more surfaces (substrates), the junctions being commonly referred to as joints, for the purpose of preventing the passage of various elements, such as for example wind, rain, snow dust, dirt, noise, heat, and cold. Sealants are generally composed of one or two basic ingredients (e.g., polymers) herein called base materials, plus several additives such as plasticizers, fillers, pigments, adhesion promoters, and stabilizers.

Sealants can be either one-component or multi-component systems, wherein the number of components in the system designates the number of mixtures that are mixed together just prior to use of the final sealant composition. Although the sealant base in the practice of the invention can be either a one-component or a multi-component system, a one-component system is the preferred type of system. Also, although the sealant type can be a hot melt, solvent release, chemically cured, or moisture cured sealant, a hot melt sealant (which requires no curing period and which does not give off any solvents to pollute the atmosphere) is preferred.

In the practice of the invention, the base material is a rubbery or resinous polymer. Included among the materials which are suitable are conjugated diene/monovinyl-substituted aromatic hydrocarbon teleblock copolymers, butylbase polymers, polysulfide polymers, urethane polymers, and suitable mixtures thereof. Of the above-listed base materials, preferred are conjugated diene/monovinyl-substituted aromatic hydrocarbon teleblock copolymers. Although the invention is broadly applicable to both rubbery and resinous polymers, at present rubbery copolymers are especially preferred since they are especially useful in hot melt sealants. The rubbery copolymers can be either linear or branched in structure and either saturated (hydrogenated) or unsaturated. However, branched (i.e., radial teleblock) copolymers are preferred over linear copolymers; and unsaturated are preferred over saturated.

A preferred group of radial teleblock copolymers include those prepared by using 1,3-butadiene or isoprene or mixtures thereof as the conjugated diene, styrene as the monovinyl substituted aromatic hydrocarbon monomer, and either silicon tetrachloride (for preparing unsaturated copolymers) or polyepoxides (for preparing saturated copolymers) as coupling agents.

The weight ratio of conjugated diene/monovinyl-substituted aromatic hydrocarbon monomers in said teleblock copolymers is preferably within the broad range from about 50/50 to about 90/10. More preferred is the range from about 60/40 to about 85/15. The weight average molecular weight of the rubbery copolymer base is preferably within the range from about 50,000 to about 500,000; and even more preferred is the range from about 90,000 to about 325,000.

The physical properties of some especially preferred copolymers which have been used as the base polymer in the examples in this invention are shown in the following table.

Table A

| Copolymer | Polymer Type | Diene-Styrene Weight Ratio | Coupling Agent | Molecular Weight, Weight Average, $M_w$ |
|---|---|---|---|---|
| 1. Unsaturated | Radial | | | |

Table A-continued

| Copolymer | Polymer Type | Diene-Styrene Weight Ratio | Coupling Agent | Molecular Weight, Weight Average, $M_w$ |
| --- | --- | --- | --- | --- |
| Copolymer D | Teleblock | 70/30 | SiCl$_4$ | 300,000 |
| 2. Saturated Radial | | | | |
| Copolymer E[a] | Teleblock | 70/30 | Polyepoxide | 95,000 |

[a] Less than 30 percent vinyl before hydrogenation.

The epoxy resin (which is required to be present in the practice of this invention) is the principal adhesion promoter in the inventive sealant formulation. Broadly, any uncured epoxy resin having at least one (but preferably two or more) terminal epoxy groups

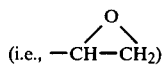

(i.e., —CH—CH$_2$)

such as for example those derived from epichlorohydrin and a polyol (e.g., bisphenol A, novolac, etc.) can be used in this invention. Included in this group are the materials used in the examples, which have the general formula

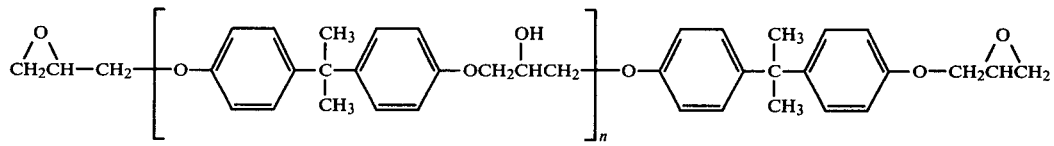

where n varies from 0 to about 25. These are diglycidyl ethers of bisphenol A (called bisphenol A-epichlohydrin resins) and include resins referred to by Shell Development Company as "Epon ®" resins. Some of the more common epoxy resins of this type are:

| Trade Name of Resin | Approximate n of Above Formula | Epoxy Equivalent Weight |
| --- | --- | --- |
| Epon 815 | 0 | 175–195 |
| Epon 820 | <1 | 180–195 |
| Epon 828 | <1 | 185–192 |
| Epon 1001 | 2–3 | 450–550 |
| Epon 1007 | 14–15 | 2000–2500 |
| Epon 1009 | 14–25 | 2500–4000 |

The epoxy-novolac series may also be used in this invention. These materials have the general formula:

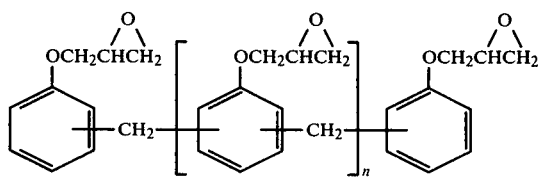

wherein n varies from 1 to about 12.

The epoxide equivalent of the epoxy resin should lie within the range from about 100 to about 4000 and preferably lies within the range from about 150 to about 2000.

The U.V. stabilizer used in the practice of the invention can be broadly any thioamino nickel-containing U.V. absorber. This broad group would include, for example, nickel amine complexes of 2,2'-thiobis (p-alkylphenols). Included within this narrower group are, for example, the materials having the general formulas

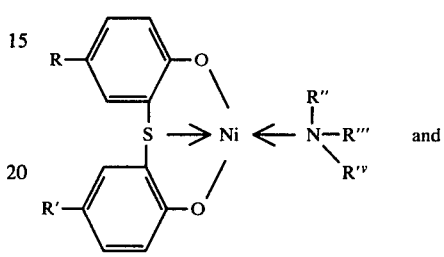

and

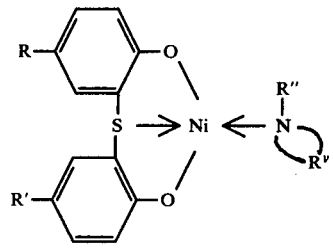

wherein R and R' are selected from the group comprising hydrogen and alkyl and cycloalkyl groups containing 1 to about 18 carbon atoms, wherein R'', R''', and R'$^v$ are selected from the group comprising hydrogen and alkyl, cycloalkyl, aromatic, alkyl-substituted aromatic, and heterocyclic hydrocarbon groups which contain 1 to about 18 carbon atoms wherein R$^v$ and N form a cyclic structure which can also contain oxygen and/or sulfur and wherein R$^v$ contains from 2 to about 12 carbon atoms. These U.V. absorber materials can be prepared as described in U.S. Pat. No. 3,313,770. The preparation of the U.V. absorber is simplified when R and R' are the same.

Used in the examples in runs 2, 4, 5, 6, 8 and 11 of the present invention was [2,2'-thiobis(4-t-octylphenolato)]-n-butylamino nickel, which has the chemical structure:

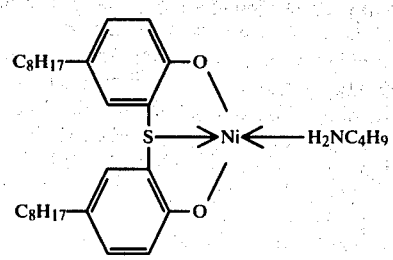

This compound is sold by the American Cyanamid Company under the tradename of Cyasorb ® 1084.

Related U.V. absorbers outside the scope of this invention (which were used in combination in run 7) are a proprietary nickel phosphate presently sold by Ciba-Geigy Company under the tradename of Irgastab ® 2002 and octadecyl-3,5-di-t-butyl-4-hydroxy hydrocinnamate (presently sold by Ciba-Geigy Company under the tradename of Irganox ® 1076). That combination of U.V. absorbers together with an epoxy resin was found not to exhibit the unexpected results shown by the U.V. absorbers within the scope of the invention.

When Cyasorb ® 1084 is used as the U.V. absorber and when Epon 828 is used as the epoxy resin, the weight ratio of U.V. absorber to epoxy resin should be within the range from about 1:1.5 to about 1:3.0; and the sum of the weight percents of U.V. absorber and of epoxy resin should be at least about 3 weight percent of the total weight of sealant composition.

In the practice of the invention, certain optional ingredients can be present, including plasticizers, mineral fillers and pigments.

Numerous liquid or semi-liquid, waxy, or low melting solid materials can be used as plasticizers in the sealant formulation. Generally, the only requirement is that the plasticizer be compatible (i.e., that no substantial disagreeable side effects occur, such as bleeding or discoloration) with the ingredients of the sealant formulation. For example, unsaturated conjugated diene/monovinyl-substituted aromatic hydrocarbon teleblock copolymers are compatible with paraffinic and naphthenic oils (e.g., Tufflo ® 6056 and 6204, respectively) but generally incompatible with polybutene type plasticizers (e.g., Indopols ®). Saturated (hydrogenated) conjugated diene/monovinyl-substituted aromatic hydrocarbon teleblock copolymers are generally compatible with most plasticizers. Simple alkyl esters of rosin acids (e.g., Hercolyn D ®) are another class of suitable plasticizers for the sealants which are produced according to the invention.

Mineral fillers are generally added to the sealant formulation to improve such properties as sag, stiffness (modulus), toughness, and hardness, as well as to lower the cost. Any suitable mineral filler can be used, the selection of which is left to those skilled in the art. Generally, a combination of fillers is preferred. Such fillers can be, for example, metal carbonates, metal silicates, talcs, metal sulfates, clays, metal oxides like zinc oxide and titanium dioxide, and carbon black. In the following examples, the fillers used were calcium carbonate (Purecal ®), titanium dioxide (Titanox ®) and zinc oxide (AZO ® ZZZ555).

When the sealant to be prepared is a hot-melt sealant, at least one thermal stabilizer and at least one modifying resin are required to be present in the sealant formulation.

The thermal stabilizers are added to the sealant formulation to prevent or minimize degradation during the original compounding or subsequent hot melt application, both of which are generally done at about 177° C. (350° F.). Any suitable thermal stabilizer for the base polymer will usually be suitable in this invention, providing, of course, that the stabilizer material is compatible with the other sealant ingredients. Various proportions and combinations of stabilizers can be employed when necessary. The stabilizers used in the following examples were four parts of an alkylated arylated bisphenolic phosphite (Agerite Geltrol ®, sold by R. T. Vanderbilt Company) and one part of dilaurylthiodipropionate (DLTDP).

When the preferred conjugated diene/monovinyl-substituted aromatic hydrocarbon copolymer is the base material, two types of modifying resins are preferably employed and are selected on the basis of compatibility with various segments of the conjugated diene/monovinyl aromatic copolymer. Resins more compatible with the polyvinyl aromatic portion of the copolymer are those having a significant amount of aromatic content such as, for example, poly(methyl styrene), poly(vinyl toluene-alpha methyl styrene) (e.g., Piccotex ® 120, manufactured by Hercules), coumarone-indene copolymers, and polymerized aromatic resins. Resins more compatible with the poly-conjugated diene portion of the copolymer are those having a significant amount of paraffinic characteristics such as, for example, poly-mixed olefins, polyterpenes, cycloaliphatic resins (e.g., Pexalyn ® A 072, manufactured by Hercules), polydipentenes, and rosin acid esters.

Some suitable hot melt sealant formulations according to the invention are included in the following table.

| Ingredients | Weight Percent | |
|---|---|---|
| | Broad | Preferred |
| Rubbery copolymer | 8–35 | 12–20 |
| Modifying Resins | 8–35 | 12–20 |
| Plasticizers | 15–40 | 25–35 |
| Mineral Fillers | 15–40 | 20–30 |
| Thermal Stabilizers | 0.1–2.0 | 0.5–1.2 |
| Inventive Ingredients | | |
| Epoxy Resin | 1–10 | 2.0–5.0 |
| U.V. Stabilizer | 0.7–3.0 | 1.0–2.0 |

The temperature for mixing the ingredients in the inventive formulation should be selected to obtain a substantially homogeneous mixture within a relatively short time period.

The time of mixing will generally be from about 0.5 to about 3.0 hours and must be long enough so that the final mixture is substantially homogeneous.

The sealant formulation according to the invention can be mixed in any suitable manner for making a substantially homogeneous mixture of the components. One such method, used in the examples in the current invention, is to intimately mix the ingredients in a hot Baker-Perkins type mixer until they are substantially homogeneous.

Articles of manufacture, such as, for example, insulated glass windows, are constructed according to the invention by applying the sealant composition prepared according to the invention to joints of the article. No primer is required to be used. A preferred method is to make a hot melt sealant in the form of a rope (although strips can be used) and feed the material into a hot melt gun. Using the gun, one applies the molten sealant to joints.

EXAMPLES

Examples I and II illustrate the preparation of the inventive sealant formulation wherein the base material was an unsaturated butadiene/styrene copolymer (Example I and Table I) or a saturated butadiene/styrene copolymer (Example II and Table II).

Examples III, IV, V, and VI further illustrate advantageous properties of the unsaturated butadiene/styrene copolymer-based composition of Run 8 in Table I when it is used as a hot melt sealant, as compared with the properties of certain commercial hot melt sealants based on butyl rubber.

EXAMPLE I

In each run, a 1-quart Baker-Perkins dispersion-blade mixer was heated to 177° C. (350° F.) and maintained at that temperature by means of an electrically heated hot circulating oil bath. To the hot mixer was added 45 grams polymer D as defined above in Table A, 45 grams of a poly(vinyl toluene-alpha methyl styrene) modifying resin (Piccotex 120), 45 grams of a cycloaliphatic modifying resin (Pexalyn A072), 2.0 grams of an alkylated arylated bisphenolic phosphite stabilizer (Agerite Geltrol), 0.5 grams DLTDP and an amount of Cyasorb 1084 U.V. absorber indicated in Table I as a weight percentage. After about 15 minutes the mixture was somewhat molten and reasonably dispersed, whereupon the remaining ingredients were added: 77.1 grams of a paraffinic extender oil (Tufflo Oil 6056), 40.3 grams calcium carbonate, 13.4 grams titanium dioxide, 13.4 grams zinc oxide, and an amount of Epon 828 indicated in Table I as a weight percentage. In Run 7, instead of Cyasorb 1084, a mixture of two other U.V. absorbers was used, as noted in Run 7 in Table I. The mixture was stirred until completely dispersed which usually took an additional 1.0 to 1.5 hrs. The formulation was removed hot from the mixer and cooled in block form to about 25° C. Thin strips of the solid were then cut and placed in a hot melt gun; and molten sealant was applied to joints.

Canvas peel strength test specimens were prepared on clean unprimed surfaces of glass, concrete and aluminum and the applied hot melt sealant was allowed to cool to ambient room temperature. The specimens were then tested before and after water immersion according to Federal Specification TT-S-230C (described below) for elastomeric single component sealants in duplicate on an Instron tester (Model TT) at a cross-head speed of 2 in./min. The averages of the results for the duplicate specimens are recorded in Table I.

Federal Specification TT-S-230C is a stringent series of tests. In the canvas peel strength test, the sealant is applied to a flat surface, 3 in. × 6 in., in a laminate fashion. The laminate is immersed in water for 7 days. Then, a force is exerted on the sealant; and the minimum force in a 180° directional pull necessary to separate the sealant at the given cross-head speed from the flat surface is measured. The force per unit area is then calculated. The results are recorded in Table I.

Another test run was done on sealant samples applied to glass. The glass sealant laminates were then exposed to 200 hours of continuous U.V. radiation in an Atlas Weatherometer (Model 25-WR, equipped with a Xenon lamp, at 145° F., 50 percent relative humidity, with intermittent water spray which was on in each 10 minute period for 1.5 minutes and off for 8.5 minutes). After this exposure, the test according to Federal Specification TT-S-230C (as described above) was administered and the results are shown in Table I.

Table I

| Adhesion Promoter Effects on Canvas Peel Strength (Unsaturated Butadiene/Styrene Copolymer, Copolymer D[a],-Based Hot Melt Sealant) | | | | | | | | |
|---|---|---|---|---|---|---|---|---|
| | Run Number | | | | | | | |
| | 1 (Control) | 2 (Control) | 3 (Control) | 4 | 5 | 6 | 7 | 8 |
| Adhesion Promoter | | | | | | | | |
| Epon 828, wt. % | — | — | 3.10 | 0.52 | 1.04 | 2.05 | 3.05 | 3.05 |
| Cyasorb 1084, wt. % | — | 1.57 | — | 1.56 | 1.56 | 1.54 | — | 1.52 |
| 50:50 wt. ratio of Irgastab 2002/Irganox 1076, wt. % | — | — | — | — | — | — | 1.52 | — |
| Canvas Peel Strength Before and After 7-Day Water Immersion, kN/m (ppiw) | | | | | | | | |
| Glass: Before Immersion | 3.6 (21) | 1.2 (6.6) | 8.6 (49) | 1.4 (8.1) | 2.3 (13) | 2.3 (13) | 10.3 (59) | 7.9 (45) |
| After Immersion | 0.3 (2) | 0.3 (2) | 1.9 (11) | 0.9 (5.4) | 0.8 (4.6) | 1.2 (7.1) | 0.8 (4.9) | 6.8 (38.8) |
| Glass (+200 hours U.V.): | | | | | | | | |
| Before U.V. and Immersion | — | — | — | — | — | — | 10.3 (59) | 7.9 (45) |
| After U.V. and Immersion | — | — | — | — | — | — | <.17 (1) | 6.8 (38.8) |
| Concrete: Before Immersion | 1.2 (7) | 2.3 (13) | 3.5 (20) | 1.3 (7.5) | 1.4 (8) | 1.4 (8) | 0.8 (4.7) | 1.4 (8) |
| After Immersion | 0.7 (4.1) | 1.5 (8.5) | 1.2 (7) | 0.4 (2.3) | 2.8 (16) | 3.1 (17.8) | 0.5 (2.9) | 2.1 (12) |
| Aluminum: Before Immersion | 3.2 (18) | 2.3 (13) | 4.6 (26) | 2.1 (12) | 4.3 (24.8) | 6.3 (36) | 13.6 (77.5) | 11.0 (63) |
| After Immersion | 4.4 (25) | 1.2 (7) | 7.9 (45) | 1.0 (5.5) | 1.8 (10.5) | 3.3 (18.8) | 7.3 (41.5) | 7.9 (45) |

[a] described in Table A

The results in Table I clearly illustrate the improvement in adhesive strength obtained when both a thioamino-nickel-containing U.V. absorber and an epoxy resin are combined with a base of unsaturated butadiene/styrene copolymer in a sealant formulation. Run 8 demonstrates a sealant which excellently withstands both U.V. exposure and weathering by water. The canvas peel strength values in Run 8 both before weathering and after weathering are high. This is true for water weathering alone and for U.V. and water weathering combined. In contrast, control runs 1, 2, and 3 all show a low canvas peel strength after water weathering; and although data were not obtained for control runs 1, 2, and 3 for weathering due to both water and U.V. exposure, it is clear that additional U.V. exposure would have lowered the canvas peel strength value for each run below that value obtained for the corresponding run for water exposure without U.V.

EXAMPLE II

The procedure used in Example I for the preparation and testing of a sealant based on unsaturated butadiene/styrene copolymers was used for a similar preparation and testing of a saturated (hydrogenated) butadiene/styrene copolymer (copolymer E, described in Table A) with only some minor variations in the quantities and plasticizer used. The sealant formulation for run 11 is shown as follows, wherein trademarked ingredients were as defined earlier:

| Ingredients | Grams | Weight Percent |
|---|---|---|
| 1. Rubbery Copolymer-Copolymer E | 45 | 14.37 |
| 2. Modifying Resins-Piccotex 120 | 45 | 14.37 |
| Pexalyn A 072 | 45 | 14.37 |
| 3. Plasticizer-Indopol H-100 (polybutene) | 97.1 | 31.00 |
| 4. Fillers-Purecal S.C. | 40.3 | 12.86 |
| Titanium Dioxide | 13.4 | 4.28 |
| Zinc Oxide | 13.4 | 4.28 |
| 5. Stabilizers-Agerite Geltrol | 2.0 | 0.64 |
| DLTDP | 0.5 | 0.16 |
| 6. Invention ) Epon 828 | 9.0 | 2.87 |
| ) Cyasorb 1084 | 2.5 | 0.80 |
|  | 313.2 | 100.00 |

With the exceptions of the epoxy resin and U.V. absorber, the ingredients and their amounts were equal in Runs 9 and 10 to those in Run 11. In Runs 9 and 10, the weight percents of epoxy resin and/or U.V. absorber were as shown in Table II.

Table II

Adhesion Promoter Effects on Canvas Peel Strength (Saturated Butadiene/Styrene Copolymer-Based Hot Melt Sealant)

| | Copolymer E Based[a] Run Number | | |
|---|---|---|---|
| | 9 | 10 | 11 |
| Adhesion Promoter: | | | |
| Epon 828, wt. % | — | 2.87 | 2.86 |
| Cyasorb 1084, wt. % | — | — | 0.79 |
| 50:50 wt. Ratio of Irgastab 2002/Irganox 1076, wt. % | 0.79 | 0.77 | — |
| Canvas Peel Strength Before and After 7-Day Water Immersion, kN/m (ppiw) | | | |
| Glass: Before Immersion | 0.4 (2) | >6.04 (34.5) | 10.1 (57.5) |
| After Immersion | <0.17 (1) | <0.17 (1) | 5.3 (30) |
| Glass: Before U.V. and Immersion | — | >6.04 (34.5) | 10.1 (57.5) |
| (+200 hrs U.V.) After U.V. and Immersion | — | <0.17 (1) | 0.3 (1.7) |
| Concrete: Before Immersion | 0.9 (5) | 1.3 (7.5) | 3.1 (17.5) |
| After Immersion | 0.8 (4.5) | 0.4 (2.5) | 3.7 (21.3) |
| Aluminum: Before Immersion | 0.3 (1.7) | >8.8 (50) | 9.6 (55) |
| After Immersion | 0.6 (3.3) | 1.4 (8.3) | 10.9 (62.5) |

[a]Defined in Table A.

The results in Run 11 of Table II show that when a thioamino-nickel-containing U.V. absorber and an epoxy resin are combined with a saturated butadiene/styrene copolymer and applied to glass, a sealant is produced which will excellently withstand much weathering by water but not much weathering due to the combination of water and U.V. exposure. When water weathering alone is present, the adhesive strength to glass, to concrete, and to aluminum are all high both before and after exposure to water.

EXAMPLE III

The following example describes the preparation of samples and the subsequent testing for the determination of moisture vapor transmission (MVT). Moisture vapor transmission is defined as the rate of water vapor transmission through a film of specified area and thickness under the conditions of the test. The rate can be reported in g/20 mil/24 hrs/100 in.$^2$.

Approximately 35 grams of butadiene/styrene copolymer-based hot melt sealant of Run 8 in Table I was dispersed in 50 milliliters of toluene by mechanically mixing the ingredients at room temperature in a 4 oz. bottle for 24 hrs. This dispersion was poured into a 15.24 cm (6 in.)×30.48 cm (12 in.)×0.32 cm (0.125 in.) mold equipped with a silicone release paper backing. The solvent was allowed to slowly evaporate for 5 days at ambient room temperature. Circular specimens (8.89 cms, or 3.5 in. in diameter and approximately 20 mils thick) were cut from the rubbery sample and placed on stainless steel screens (3–18 mesh) of the same size for subsequent MVT tests.

The test for MVT herein employed is an ASTM method, E 96-66, condition E. The maximum acceptable MVT value is generally accepted to be 8 grams/100 in.$^2$/24 hrs/20 mils. The butadiene/styrene copolymer-based sealant herein described had a MVT value of 0.16 grams/100 in.$^2$/24 hrs/20 mils. A commercial butyl-based hot melt glass sealant (Novatherm ® 415) was similarly prepared and tested and had a MVT value of 0.03 grams/100 in.$^2$/24 hrs/20 mils. Therefore, the butadiene/styrene copolymer-based sealant has an MVT value which is nearly as good as that of a commercially available butyl-based sealant.

EXAMPLE IV

Elastic recovery is a measure of the ability of a sealant to return to its original shape after extreme extension or elongation and thereby to continue to seal the joint without failure due to distortion. Two test samples were prepared by applying the butadiene/styrene copolymer-based hot melt sealant of Run 8 in Table I herein described at about 177° C. (350° F.) in a 1.27 cm (0.5 in)×1.27 cm (0.5 in)×5.08 cm(2.0 in) bead between parallel faces of clean but unprimed aluminum, 2.54 cm (1.0 in)×5.08 cm (2.0 in)×0.47 cm (0.187 in). Polyethylene spacers were used to maintain the proper bead size. After cooling to ambient room temperature, the samples were placed in 100% extension for 24 hours with the use of 2.54 cm (1.0 in) shims. After 24 hours at 100 percent extension at room temperature, the shims were removed and the sealant bead was allowed to relax. After one hour, the distance between the aluminum plates (here called the relaxation length) was measured; and the percent recovery was calculated as follows:

Percent Recovery = 
$$\frac{(\text{extended length} - \text{relaxation length})}{(\text{extended length} - \text{original length})} \times 100$$

The butadiene/styrene copolymer-based sealant herein described had an 80 percent recovery value.

Two commercial butyl-based hot melt sealants were evaluated in a similar manner. The first such commercial sealant, butyl-based A (Williamson ® 608) had 0 percent recovery and the second commercial sealant, butyl-based B (Novatherm ® 415) had 35 percent recovery. Therefore, based on the percent recovery, the butadiene/styrene copolymer-based sealant was definitely superior as a sealant.

EXAMPLE V

Bulk melt viscosities were determined on the three sealants described in Example IV. Bulk melt viscosity is a measure of the ability of the sealant to flow at elevated temperatures. The bulk melt viscosity was measured on a Brookfield viscometer, Model RVT-E using spindle no. 29, equipped with a Thermosel control unit. The bulk melt viscosity was measured at 177° C. (350° F.), which is a common application temperature for hot melt sealants. The data listed below in Table III show that the sealant of the current invention had the lowest viscosity at 177° C. This is advantageous in that a lower application temperature may be used for the invention sealant than that which must be used for the butyl-based sealants that were tested. Hence, this fact indicates an energy cost savings in the application of the butadiene/styrene copolymer-based sealant.

Table III

| Sealant Base | Bulk Metal Viscosity, 177° C. (350° F.) | |
|---|---|---|
| | kPaS | Cps |
| 1. Butadiene/styrene copolymer-based[a] | 50,000 | 50,000 |
| 2. Commercial butyl-based copolymer A[b] | >2,000,000 | >2,000,000 |
| 3. Commercial butyl-based copolymer B[c] | 625,000 | 625,000 |

[a]Copolymer D (described in Table A)
[b]Williamson ® 608
[c]Novatherm ® 415

EXAMPLE VI

Canvas peel strengths were also determined for the three hot melt sealants described in Example V. The minimum acceptable value set by the government for sealants used in the building trade is 0.875 kilo Newtons per meter (kN/m) or 5 pounds per inch width (ppiw), which minimum value all three samples met or exceeded after water exposure and after water with U.V. exposure. The results, listed below in Table IV, show that the inventive sealant had the highest canvas peel strengths under all test conditions. These high canvas peel strengths, particularly after water exposure, indicate that the inventive sealant produces a much more durable sealant system.

TABLE IV

Canvas Peel, 180°, After 7 Days Water Immersion

| | Butyl-Based A[d] | | Butyl-Based B[e] | | Butadiene/Styrene[f] | |
|---|---|---|---|---|---|---|
| | kN/m | ppiw | kN/m | ppiw | kN/m | ppiw |
| a. Glass surface | 2.45 | 14 | 0.875 | 5 | 6.825 | 39 |
| b. Glass surface with 200 hrs. U.V. exposure before H₂O immersion. | 1.93 | 11 | 1.40 | 8 | 6.825 | 39 |
| c. Aluminum surface | 3.85 | 22 | 1.05 | 6 | 6.125 | 35 |

[d]Williamson ® 608
[e]Novatherm ® 415
[f]Copolymer D, described in Table A

It is intended that the claims be interpreted to cover modifications and equivalents of the above description which would be apparent to one with ordinary skill in the art.

What is claimed is:

1. A sealant composition comprising:
   (a) a base material selected from the group consisting of rubbery and resinous polymers;
   (b) a nickel amine complex of 2,2'-thiobis (p-alkylphenol);
   (c) an uncured epoxy resin having at least one terminal expoxy group; and
   wherein the nickel amine complex and the uncured epoxy resin comprise at least about 3 percent by weight of said sealant composition.

2. A composition according to claim 1 wherein said nickel amine complex of 2,2'-thiobis (p-alkylphenol) is selected from the group consisting of the materials having the formulas

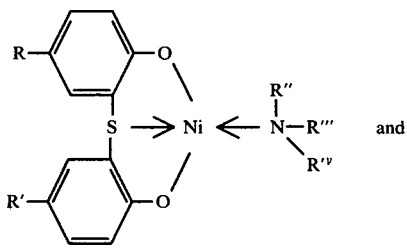

and

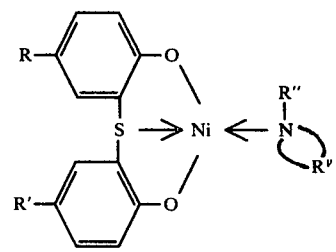

wherein R and R' are selected from the group consisting of hydrogen and alkyl and cycloalkyl groups containing 1 to about 18 carbon atoms, wherein R'', R''', and R'ᵛ are selected from the group consisting of hydrogen and alkyl, cycloalkyl, aromatic, alkyl-substituted aromatic, and heterocyclic hydrocarbon groups which contain 1 to about 18 carbon atoms, wherein Rᵛ and N form a cyclic structure and wherein Rᵛ contains from 2 to about 12 carbon atoms.

3. A composition according to claim 2 wherein said base material is selected from the group consisting of butyl-base polymers, conjugated diene/monovinyl-substituted aromatic hydrocarbon teleblock copolymers, polysulfide copolymers, urethane copolymers, and mixtures thereof.

4. A composition according to claim 3 wherein said base material of said sealant is a rubbery conjugated diene/monovinyl-substituted aromatic hydrocarbon teleblock copolymer.

5. A composition according to claim 4 wherein said sealant is a hot melt sealant and wherein said sealant additionally contains at least one modifying resin and at least one thermal stabilizer.

6. A composition according to claim 1 wherein said epoxy resin is a diglycidyl ether of bisphenol A which has an epoxy equivalent weight lying within the range from about 180 to about 195.

7. An article of manufacture wherein at least a portion thereof has bonded thereto a sealant composition according to claim 1.

8. An article of manufacture wherein at least a portion thereof has bonded thereto a sealant composition according to claim 6.

9. An article of manufacture according to claim 8 wherein said article is made of glass.

10. An article of manufacture according to claim 8 wherein said article is made of aluminum.

11. An article of manufacture wherein a portion of one material is bonded to a portion of another material by the sealant composition according to claim 1.

12. An article of manufacture wherein a portion of one material is bonded to a portion of another material by the sealant composition according to claim 6.

13. An article of manufacture according to claim 11 wherein said materials are glass and aluminum.

14. An article of manufacture according to claim 12 wherein said materials are glass and aluminum.

15. A method of making a sealant comprising combining:
(a) a base material selected from the group consisting of rubbery and resinous polymers; and
(b) a nickel amine complex of 2,2'-thiobis (p-alkylphenol); and
(c) an uncured epoxy resin having at least one terminal epoxy group.

16. A hot melt sealant according to claim 5 wherein said nickel amine complex of 2,2-thiobis (p-alkylphenol) is n-butylamino nickel and wherein said epoxy resin is a diglycidyl ether of bisphenol A.

17. A composition according to claim 16 wherein the weight ratio of said n-butylamino nickel to said diclycidyl ether of bisphenol A is within the range from about 1:1.5 to 1:3.0.

18. A method of increasing the adhesive strength and water weathering and U.V. weathering properties of a sealant composition comprising (a) a base material selected from the group consisting of rubbery and resinous polymers; and (b) an uncured epoxy resin having at least one terminal epoxy group, said method comprising: combining with said base material and said epoxy resin a nickel amine complex of 2,2'-thiobis (p-alkylphenol).

19. A method according to claim 20 wherein said nickel amine complex of 2,2'-thiols (p-alkylphenol) is selected from the group consisting of the materials having the formulas

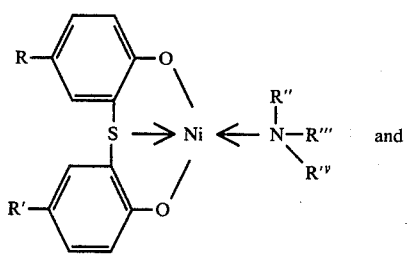

and

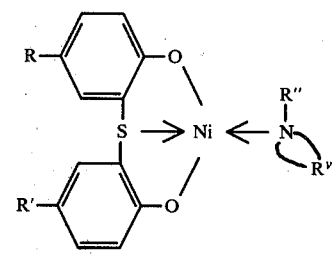

wherein R and R' are selected from the group consisting of hydrogen and alkyl and cycloalkyl groups containing 1 to about 18 carbon atoms, wherein R'', R''', and R'v are selected from the group consisting of hydrogen and alkyl, cycloalkyl, aromatic, alkyl-substituted aromatic, and heterocyclic hydrocarbon groups which contain 1 to about 18 carbon atoms, wherein Rᵛ and N form a cyclic structure and wherein Rᵛ contains from 2 to about 12 carbon atoms.

20. A method according to claim 19 wherein said nickel amine complex of 2,2'-thiobis (p-alkylphenol) is n-butylamino nickel and wherein said epoxy resin is a diglycidyl ether of bisphenol A.

21. A method according to claim 20 wherein the sum of said n-butylamino nickel and of said diglycidyl ether of bis-phenol A comprises at least about 3 weight percent of said sealant composition and wherein the weight ratio of said n-butylamino nickel to said diglycidyl ether of bisphenol A is within the range of about 1:1.5 to about 1:3.0.

22. A method according to claim 15 wherein said nickel amine complex of 2,2'-thiobis (p-alkylphenol) is selected from the group consisting of the materials having the formulas

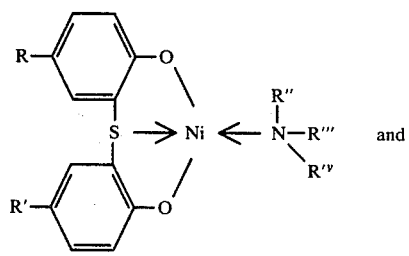

and

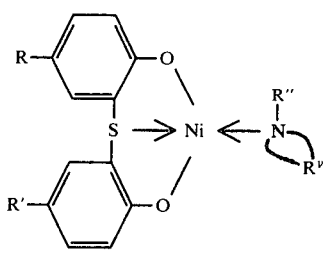
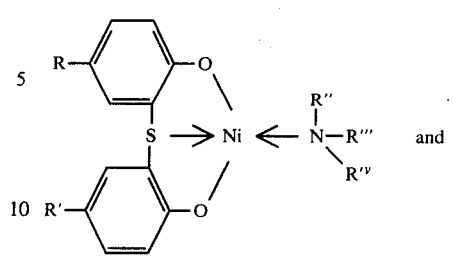

wherein R and R' are selected from the group consisting of hydrogen and alkyl and cycloalkyl groups containing 1 to about 18 carbon atoms, wherein R", R"', and R'v are selected from the group consisting of hydrogen and alkyl, cycloalkyl, aromatic, alkyl-substituted aromatic, and heterocyclic hydrocarbon groups which contain 1 to about 18 carbon atoms, wherein $R^v$ and N form a cyclic structure and wherein $R^v$ contains from 2 to about 12 carbon atoms.

23. A method according to claim 22 wherein said sealant is a hot melt sealant which additionally contains at least one modifying resin and at least one thermal stabilizer.

24. A method according to claim 23 wherein said nickel amine complex of 2,2'-thiobis (p-alkylphenol) is n-butylamino nickel and wherein said epoxy resin is a diglycidyl ether of bisphenol A.

25. A method according to claim 24 wherein the sum of said n-butylamino nickel and of said diglycidyl ether of bisphenol A comprises at least about 3 percent by weight of the sealant composition which is prepared.

26. A method according to claim 25 wherein the weight ratio of said n-butylamino nickel to said diglycidyl ether of bisphenol A is within the range from about 1:1.5 to about 1:3.0.

27. A method according to claim 28 wherein said diglycidyl ether of bisphenol A has an epoxy equivalent weight lying within the range from about 180 to about 195.

28. An article of manufacture which is subjected to an aqueous environment, said article having adhering to at least a part thereof a sealant composition comprising:
 (a) a base material selected from the group consisting of rubbery polymers and resinous polymers;
 (b) a nickel amine complex of 2,2'-thiobis (p-alkylphenol);
 (c) an uncured epoxy resin having at least one terminal epoxy group; and
 wherein the nickel amine complex and the uncured epoxy resin comprise at least about 3 percent by weight of said sealant composition.

29. An article of manufacture which is subjected to an aqueous environment, said article having adhering to at least a part thereof a sealant composition comprising:
 (a) a base material selected from the group consisting of rubbery polymers and resinous polymers;
 (b) a nickel amine complex of 2,2'-thiobis (p-alkylphenol) selected from the group consisting of the materials having the formulas

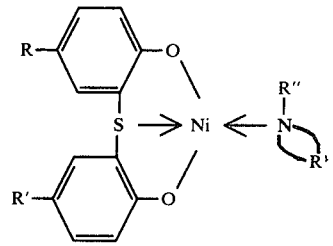

wherein R and R' are selected from the group consisting of hydrogen and alkyl and cycloalkyl groups containing 1 to about 18 carbon atoms, wherein R", R"', and $R'^v$ are selected from the group consisting of hydrogen and alkyl, cycloalkyl, aromatic, alkyl-substituted aromatic, and heterocyclic hydrocarbon groups which contain 1 to about 18 carbon atoms, wherein $R^v$ and N form a cyclic structure and wherein $R^v$ contains from 2 to about 12 carbon atoms.

30. An article of manufacture according to claim 28 or 29, wherein said sealant adheres to at least one material selected from the group consisting of glass and aluminum.

31. A method of increasing the water weathering ability of a sealant composition comprising (a) a base material selected from the group consisting of rubbery polymers and resinous polymers and (b) an uncured epoxy resin having at least one terminal epoxy group, said method being such that the canvas peel strength of said composition to at least one material selected from the group consisting of glass and aluminum remains relatively high upon exposure of said sealant to water weathering, said method comprising: combining with said base material and said epoxy resin a nickel amine complex of 2,2'-thiobis (p-alkylphenol).

32. A method of increasing the water weathering ability of a sealant composition comprising (a) a base material selected from the group consisting of rubbery and resinous polymers; and (b) an uncured epoxy resin having at least one terminal epoxy group, said methanol being such that the canvas peel strength of said composition to at least one material selected from the group consisting of glass and aluminum remains relatively high upon exposure of said sealant to water weathering, said method comprising: combining with said base material and said epoxy resin a nickel amine complex of 2,2'-thiobis (p-alkylphenol) selected from the group consisting of the materials having the formulas

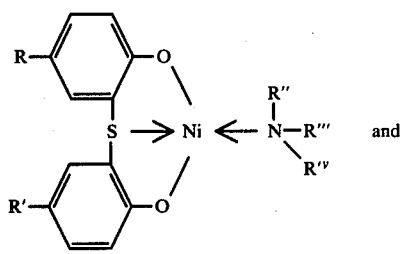

and

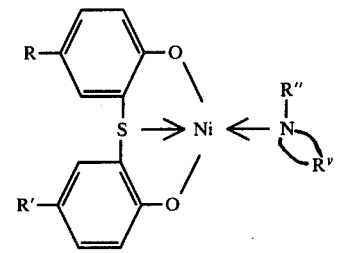

wherein R and R' are selected from the group consisting of hydrogen and alkyl and cycloalkyl groups containing 1 to about 18 carbon atoms, wherein R'', R''', and R'$^v$ are selected from the group consisting of hydrogen and alkyl, cycloalkyl, aromatic, alkyl-substituted aromatic, and heterocyclic hydrocarbon groups which contain 1 to about 18 carbon atoms, wherein R$^v$ and N form a cyclic structure and wherein R$^v$ contains from 2 to about 12 carbon atoms.

* * * * *

UNITED STATES PATENT AND TRADEMARK OFFICE
CERTIFICATE OF CORRECTION

PATENT NO. : 4,180,514
DATED : December 25, 1979
INVENTOR(S) : Richard C. Doss

It is certified that error appears in the above-identified patent and that said Letters Patent are hereby corrected as shown below:

Column 14, line 6, "20" should read --- 18 ---; line 7, "thiols" should read --- thiobis ---; line 36, "R'v" should read --- $R'^v$ ---;

Column 15, line 18, "R'v" should read -- $R'^V$ --; line 42, "28" should read --- 26 ---.

Signed and Sealed this

Eighteenth Day of March 1980

[SEAL]

Attest:

SIDNEY A. DIAMOND

Attesting Officer   Commissioner of Patents and Trademarks